(12) United States Patent
Wells et al.

(10) Patent No.: US 8,006,935 B2
(45) Date of Patent: Aug. 30, 2011

(54) CHANNEL SLIDE CARGO HANDLING SYSTEM AND METHOD

(75) Inventors: James S. Wells, Fountain Valley, CA (US); Anibal J. Garcia, Chino, CA (US); Myles A. Rohrlick, San Diego, CA (US); John B. Simmons, Corona, CA (US); Thomas K. Reiner, Sherman Oaks, CA (US)

(73) Assignee: The Boeing Company, Chicago, IL (US)

( * ) Notice: Subject to any disclaimer, the term of this patent is extended or adjusted under 35 U.S.C. 154(b) by 500 days.

(21) Appl. No.: 11/682,480

(22) Filed: Mar. 6, 2007

(65) Prior Publication Data

US 2008/0219830 A1    Sep. 11, 2008

(51) Int. Cl.
 *B64D 9/00* (2006.01)
(52) U.S. Cl. ............ 244/137.1; 244/118.1; 410/74
(58) Field of Classification Search ............ 244/118.1, 244/137.1, 137.3, 137.4, 118.2; 414/235, 414/799, 234, 387, 395, 400, 402; 410/54, 410/74, 75, 92
See application file for complete search history.

(56) References Cited

U.S. PATENT DOCUMENTS

| | | | | |
|---|---|---|---|---|
| 2,858,774 A * | 11/1958 | Batten | ............ | 410/67 |
| 3,147,942 A * | 9/1964 | Griffith | ............ | 244/118.3 |
| 3,508,764 A * | 4/1970 | Bexon et al. | ............ | 410/90 |
| 3,523,507 A * | 8/1970 | Dubin | ............ | 108/57.12 |
| 3,621,236 A * | 11/1971 | Hlinsky et al. | ............ | 410/54 |
| 4,077,532 A | 3/1978 | Bryan | | |
| 4,408,739 A * | 10/1983 | Buchsel | ............ | 244/137.1 |
| 4,699,337 A * | 10/1987 | Lewis | ............ | 244/137.1 |
| 4,915,567 A * | 4/1990 | Ellingsen | ............ | 414/345 |
| 5,531,562 A * | 7/1996 | Cordell | ............ | 414/809 |
| 5,573,360 A * | 11/1996 | Bennett | ............ | 410/84 |
| 5,588,371 A * | 12/1996 | Looker | ............ | 108/57.12 |
| 5,615,848 A * | 4/1997 | Ceriani | ............ | 244/118.5 |
| 6,427,947 B1 * | 8/2002 | Rohrlick et al. | ............ | 244/137.1 |
| 6,488,457 B2 | 12/2002 | Diamante | | |
| 6,629,581 B2 | 10/2003 | Lambiaso | | |
| 6,817,578 B1 * | 11/2004 | Garcia et al. | ............ | 244/137.1 |
| 7,252,468 B2 * | 8/2007 | Moore et al. | ............ | 410/46 |
| 2004/0018067 A1 * | 1/2004 | Taylor et al. | ............ | 410/46 |
| 2004/0099187 A1 * | 5/2004 | Cox, Jr. | ............ | 108/51.11 |
| 2007/0085288 A1 * | 4/2007 | Wells et al. | ............ | 280/79.11 |
| 2007/0104562 A1 * | 5/2007 | Wells et al. | ............ | 414/571 |

* cited by examiner

*Primary Examiner* — Joshua J Michener
*Assistant Examiner* — Brian M O'Hara
(74) *Attorney, Agent, or Firm* — Harness, Dickey & Pierce, P.L.C.

(57) ABSTRACT

A cargo handling system and method employing a plurality of slide units and tracks. The tracks are mounted in or on a floor of a cargo area of a mobile platform, and also on a ramp of the mobile platform. The slide units slide within the tracks and enable container roll in, roll out platforms (CROPs) and 1077 flatracks to be slidably moved into and out from the cargo area. The slide units are arranged at the four corners of each CROP or 1077 flatrack and can be positively locked to a CROP or 1077 flatrack by a standard ISO twist lock assembly. The slide units eliminate the need for a K-loader and a crane to be present at the site where loading or unloading is to occur. Instead, suitable vehicles such a Heavy Expanded Mobility Tactical Trucks (HEMTTs), which are more readily transported to remote cites, can be used to assist in slidably loading and offloading CROPs and 1077 flatracks.

10 Claims, 11 Drawing Sheets

CHANNEL SLIDE CARGO HANDLING SYSTEM AND METHOD

FIELD

The present disclosure relates to cargo handling systems and methods, and more particularly to a cargo handling system and method that enables load supporting structures such as container roll in, roll out platforms (CROPs) and flatracks used by the U.S. military to support cargo to be slidably loaded and unloaded from a cargo aircraft or rotorcraft.

BACKGROUND

The statements in this section merely provide background information related to the present disclosure and may not constitute prior art.

There is an interest by the U.S. military that airborne cargo carrying mobile platforms (e.g., cargo aircraft and/or rotorcraft) be capable of delivering cargo to isolated, remote sites where traditional cargo loading/offloading equipment, such as a K-loader, are not available for use. Furthermore, there is an interest in being able to load and unload container roll in, roll out platforms (CROPs) and conventional 1077 flatracks from fixed wing transport aircraft, and even from transport rotorcraft, without the need to outfit the cargo area of the aircraft or rotorcraft with a crane. A CROP is one important and popular logistics platform used by the U.S. military for supporting cargo (i.e., assets) that is to be deployed at remote sites. A 1077 flatrack is another type of logistics platform that is sometimes employed by the U.S. military for material transport operations. At the present time, these logistics platforms are typically loaded and off-loaded with the assistance of a crane. As will be appreciated, eliminating the need to outfit the aircraft or rotorcraft cargo area with a crane to assist in loading and offloading CROPs and 1077 flatracks would save significantly on weight, because a suitable crane used for this purpose typically weighs on the order of 5000 lbs. (2272 kg).

It is further desired by the U.S. military that Heavy Expanded Mobility Tactical Trucks (HEMTTs) and LHS (Load Handling System) equipped vehicles and trailers be used for loading and off-loading CROPs and 1077 flatracks. HEMTTs and LHS equipped vehicles are lighter and generally much more easily transported to remote sites than K-loaders.

Present day material handling equipment needed to support loading of CROPs and flatracks is extremely difficult (and often impossible) to deliver to, or operate at, small sites and landing zones used by direct support transport aircraft. Current processes require a large amount of material handling equipment and personnel at both the on load site as well as the offload site. Cargo being supported on a CROP cannot be delivered to sites that cannot be supported with external material handling equipment. Presently, the equipment needed to support loading/off-loading operations of a fully loaded CROP consists of a forklift, a K-loader, and a large crane. This equipment may weigh in excess of 97,000 lbs (44,090 kg) and must be delivered by aircraft, for example the C-17 cargo aircraft manufactured by The Boeing Company, to the loading or offloading site in advance of the date that the loading/off-loading operation will be performed. This makes far forward delivery of fully loaded CROPs to helicopter landing sites impossible. Additionally, if platforms are required to be placed on triple married pallets for air shipment, the increased overall length of the loads reduces the capability of aircraft by limiting the number of CROPs that can be transported on a single aircraft.

Thus, since a cargo aircraft or rotorcraft may be required to be loaded and/or offloaded at landing sites without the availability of standard material handling equipment, a system is needed to permit handling and transporting CROPs and/or 1077 flatracks without the aid of a traditional K-loader and other related cargo handling equipment. Thus, a requirement exists that any type of transport mobile platform (e.g., aircraft or rotorcraft) delivering cargo to forward deployment locations must have the capability to be unloaded without the use of a K-loader.

SUMMARY

The present system and method is directed to a channel slide cargo handling system and method for assisting in loading and offloading load supporting structures from a transport mobile platform. In one embodiment the system comprises a plurality of tracks that are secured to at least one of a floor of a mobile platform or a loading ramp associated with the mobile platform, or both of these components. A plurality of slide units are used to support a load support structure, for example a CROP or 1077 flatrack, thereon, to enable the load supporting structure to be slid along the tracks up into, or outwardly from, a cargo carrying area of the mobile platform.

In one exemplary embodiment the system makes use a plurality of four slide units. A first pair of the slide units are positioned at a first end of the tracks and used to support a first end of the load supporting structure (e.g., the CROP or 1077 flatrack). During a loading operation, the load supporting structure may be lowered onto the first pair of slide units, which are disposed on the tracks. Thus, the first pair of slide units supports a first end of the load supporting structure. The load supporting structure can then be urged slidably along the tracks to a point where a second end of the load supporting structure is disposed adjacent the first end of the tracks. A second pair of slide units may then be positioned on the tracks and the second end of the load supporting structure lowered down onto the second pair of slide units. The four slide units may then be used to continue sliding the load supporting structure along the tracks into the cargo area of the mobile platform. The operation of unloading the load supporting structure is essentially opposite to that described above.

The system and eliminates the need for a K-loader and a crane to lift the load supporting structure (e.g., CROP or 1077 flatrack). As a result, loading and off-loading of load supporting structures, such as CROPs and 1077 flatracks, may be accomplished at remote sites where it would be difficult or impossible to transport a K-loader to. The system and method also eliminates entirely the need to equip the cargo aircraft or rotorcraft with a crane, which provides a significant weight savings and enables the overall payload of the aircraft or rotorcraft to be increased.

The system and method also adds significant flexibility to the deployment of assets to various regions where a large cargo aircraft (e.g., a C-17 aircraft) or rotorcraft may be required to land, but where no K-loader is available for immediate use, but where HEMTTs are available for use to assist in the off-loading process. With the present system and method, such a cargo transport aircraft or rotorcraft could be immediately loaded or offloaded using only the available HEMTTs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
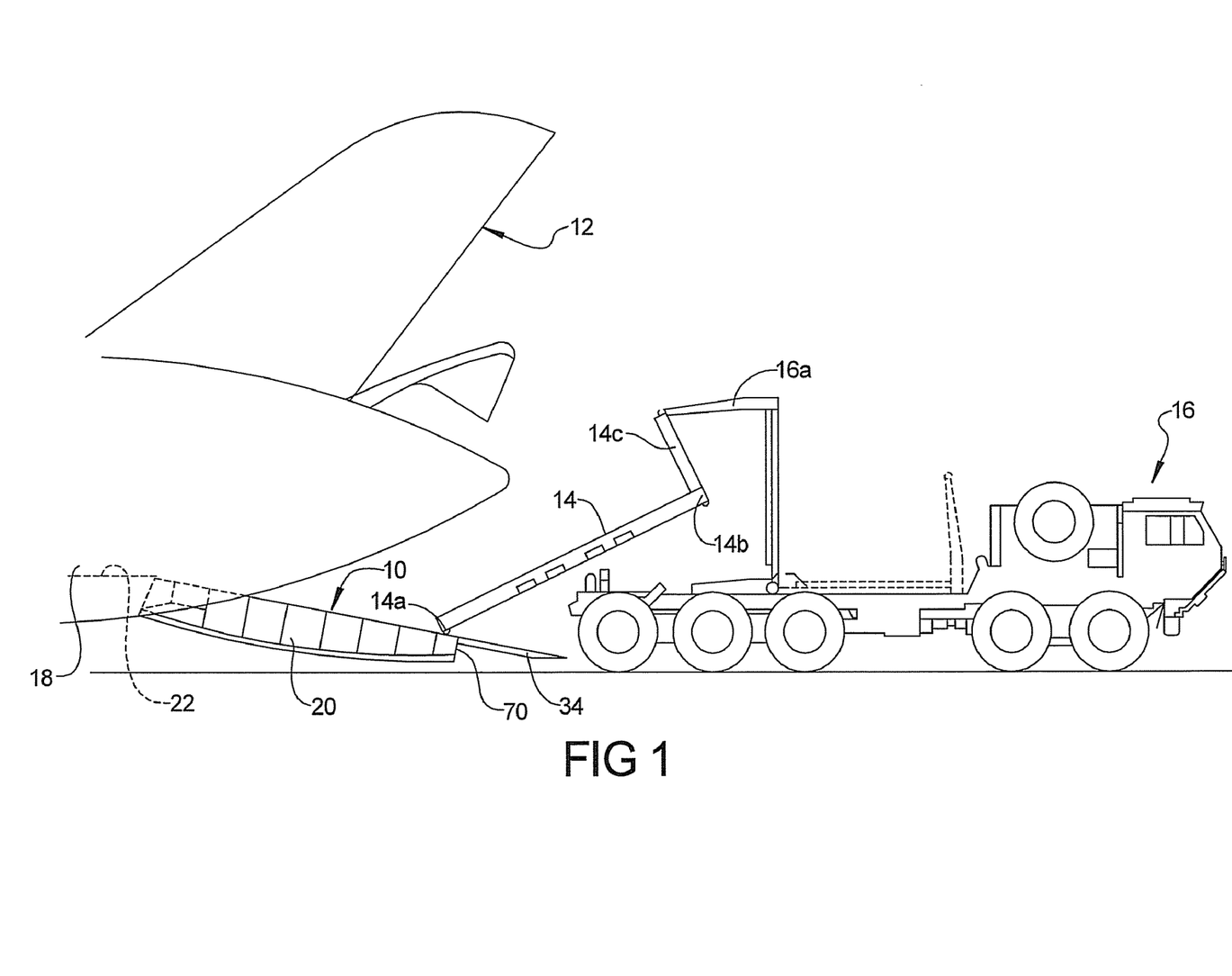
FIG. 1 is a side view of one embodiment of a system of the present disclosure being used to help load a CROP onto a ramp of a cargo aircraft, and also illustrating a HEMTT vehicle being used to assist in loading the CROP onto the ramp.

Referring to FIG. 1, there is shown a system 10 in accordance with one embodiment of the present disclosure for loading and unloading cargo from cargo transport mobile platform 12. In this example, the mobile platform 12 forms a military cargo transport aircraft, for example, a C-17 aircraft manufactured by The Boeing Company. However, the system 10 is equally applicable for use with virtually any mobile platform that is used to transport cargo. For example, the system 10 may be used in cargo transport rotorcraft, in land cargo transport vehicles or even with marine cargo transport vessels.

In FIG. 1, the system 10 is shown receiving a CROP 14 (Container Roll in Roll out Platform) that is being handled by a well known Heavy Expanded Mobility Tactical Truck (HEMTT) 16. The CROP 14 forms a load supporting structure that is able to support a wide variety of cargo thereon for shipment. A fully loaded CROP may weigh up to approximately 26,000 lbs (11,818 kg). Accordingly, suitable equipment is needed for lifting, lowering and manipulating the CROP into or out from a cargo carrying area 18 of the mobile platform 12. While the system 10 is especially well suited for use with CROPs, which are one preferred cargo supporting platform presently used by the U.S. military, the system 10 is equally well adapted for use with other load support structures, such as 1077 flatracks, which are also used by the U.S. military. Essentially, any rigid, planar supporting structure may potentially be used with the system 10. It is a principal advantage of the system 10 that conventional material handling equipment such as a K-loader and crane, which would typically be used for handling a CROP, is not required when the system 10 is employed. As will be explained further, this is because the system 10 enables the CROP 14 or other form of load supporting structure to be moved slidably along the ramp 20 and along a floor 22 of the cargo area 18 of the mobile platform 12. Thus, the system 10 enables loading and off loading of fully loaded CROPs, 1077 flatracks or other like load supporting structures without the need for large and heavy K-loaders or cranes that would could be difficult or impossible to deliver to remote sites, and also without the need to outfit the cargo area of the mobile platform 12 with a crane.

Figure 2:
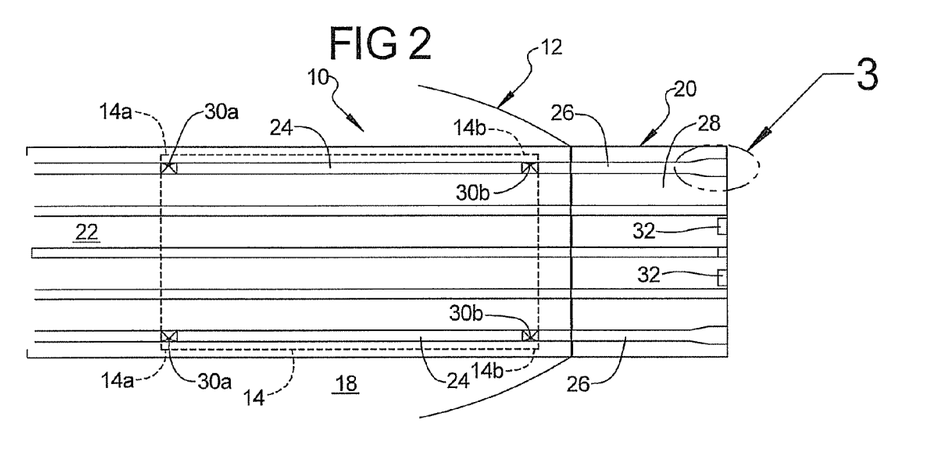
FIG. 2 is a plan view of a portion of a floor within a cargo area of the aircraft of FIG. 1, with the ramp lowered, illustrating in greater detail the tracks used in connection with the slide units, and with the CROP of FIG. 1 drawn in phantom so that the slide units are all visible.

Referring to FIG. 2, the system 10 can be seen in greater detail. In this example, the system includes a first pair of parallel arranged tracks 24 mounted within suitable recesses in the floor 22 of the cargo area 18, and a second pair of tracks 26 positioned within suitable recesses in an upper surface 28 of the loading ramp 20. The tracks 24 and 26 are further aligned contiguously so that the pair of tracks 24 and 26 essentially form two, continuously parallel lengths of tracks when the ramp 20 is in an intermediate raised position generally co-planar with the floor 22 of the cargo area 18. The tracks 24 and 26 may be formed from stainless steel, aluminum or any other suitably strong and corrosion resistant material. The tracks 24 and 26 may be formed by extrusion, roll forming or any other suitable manufacturing process.

Figure 3:
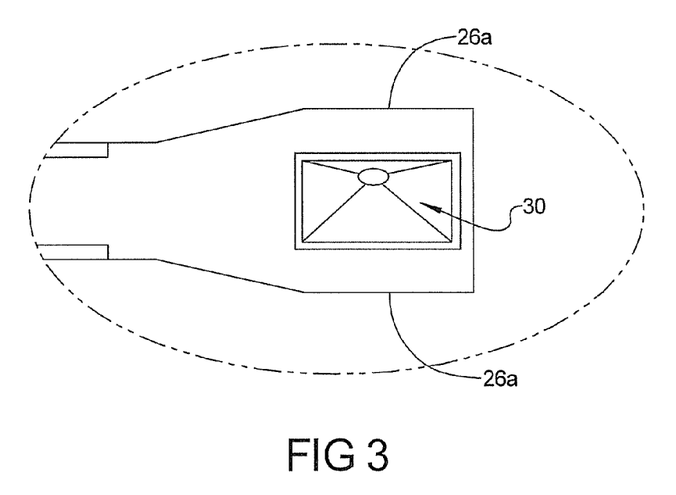
FIG. 3 is an enlarged plan view taken in accordance with circled area 3 in FIG. 2, showing one slide unit positioned in the flared end of its associated track.

The system 10 also includes a plurality of slide units 30 disposed for sliding movement within the tracks 24 and 26. A first pair of slide units 30a are disposed adjacent a forward pair of corners 14a of the CROP 14 and a second pair 30b of the slide units 30 are disposed at aft corners 14b of the CROP 14 when the CROP is fully supported by the four slide units 30. To facilitate movement of the slide units 30 into the tracks 26, each one of the tracks includes a flared outer end 26a, shown in enlarged fashion in FIG. 3. This allows for a small degree of error in the lateral positioning of the CROP 14 by the operator of the HEMTT vehicle 16 when initially placing the forward end of the CROP onto the ramp 20 during a loading operation. The flared end 26a of each track 26 helps to guide the slide units 30 into their corresponding tracks 26.

Figure 7:
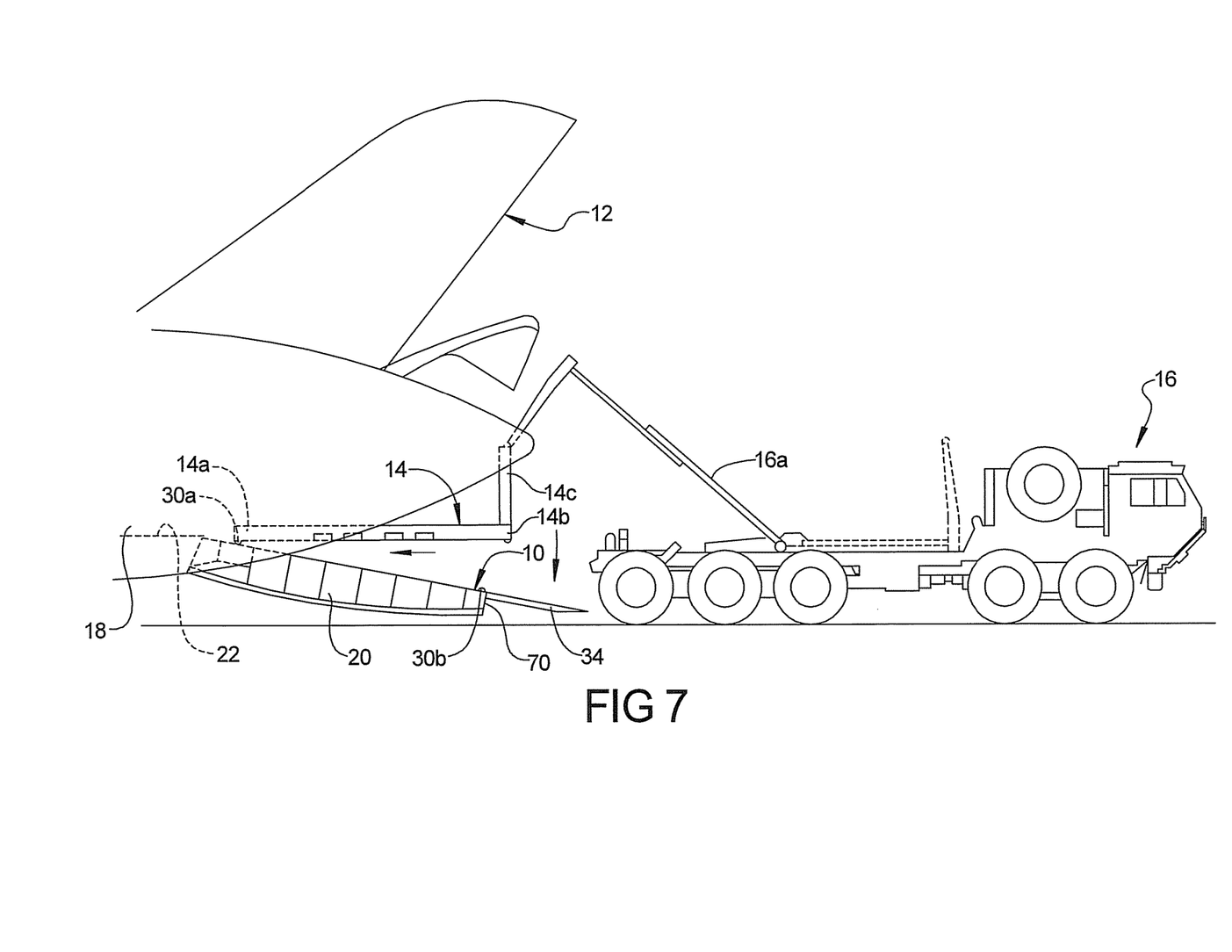
FIG. 7 is view of the CROP of FIG. 1 after a first end thereof has been urged slidably up the ramp along a first pair of the slide units to a point where a second end of the CROP may be lowered onto a second pair of slide units.

With further reference to FIG. 2, the ramp 22 may include a pair of teeter rollers 32 to assist in initially rolling the crop 14 onto the ramp. As shown in FIG. 7, a conventional ramp extension toe 34 may also be employed if desired. In those instances where overhead clearances are not adequate for a LHS equipped vehicle to load directly to the ramp 22 while the ramp is in a co-planer configuration, then the ramp must be lowered to provide adequate overhead clearance. In these situations, the ramp 22 of the aircraft 12 is preferably at least about 20 feet (6.09 meters) in length to accept a CROP or 1077 flatrack. Shorter ramps should be fitted with cantilevered ramp toes, such as ramp extension toe 34, to provide a surface of sufficient length to accept 20 foot (6.09 meter) long loads. An additional advantage of loading with a ramp extension toe 34 positioned and lowered to the ground is that it reduces or eliminates possibility of the HEMTT 16 inadvertently backing into the end of the extended ramp 20.

Figure 5:
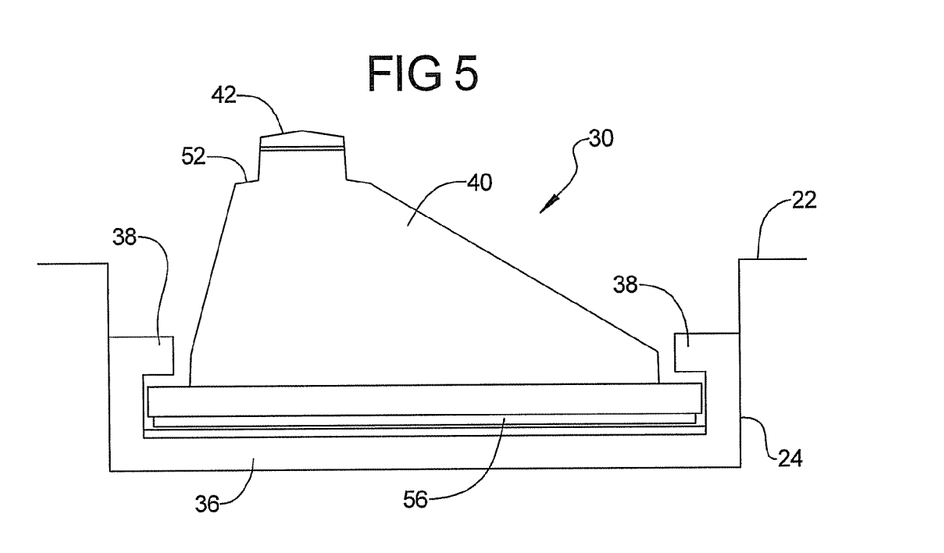
FIG. 5 is an end view of one of the tracks of FIG. 2, illustrating how the slide unit is retained within the track by the ledges of the track.

With brief reference to FIG. 5, one of tracks 24 is illustrated. The track 24 includes a bottom wall 36 and a pair of inwardly protruding ledges 38. Tracks 26 are identical in construction to that shown in FIG. 5 of track 24. Ledges 38 serve to retain the slide unit 30 within the track 24.

Figure 4A:
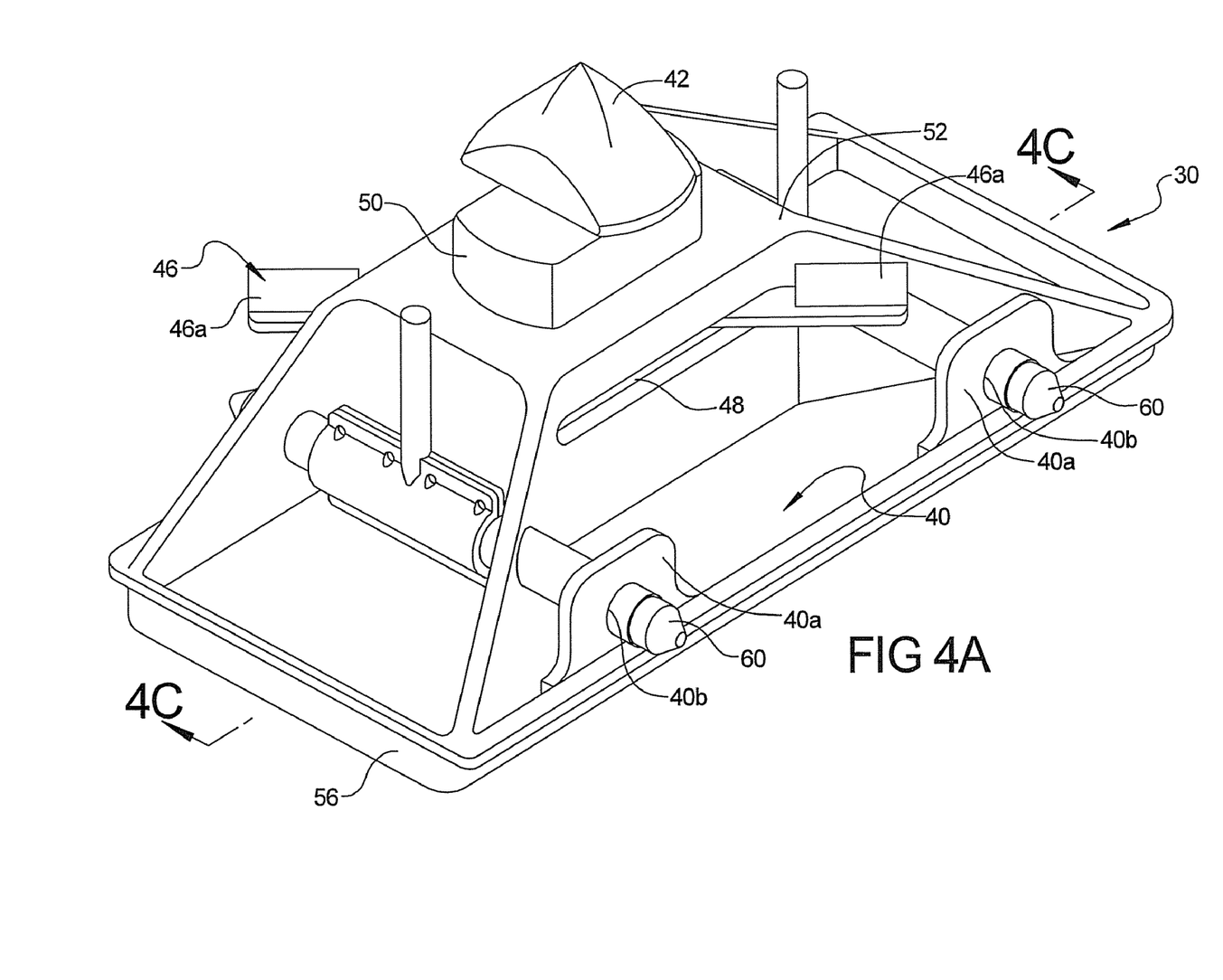
FIG. 4A is a perspective view of one of the slide units.
Figure 4B:
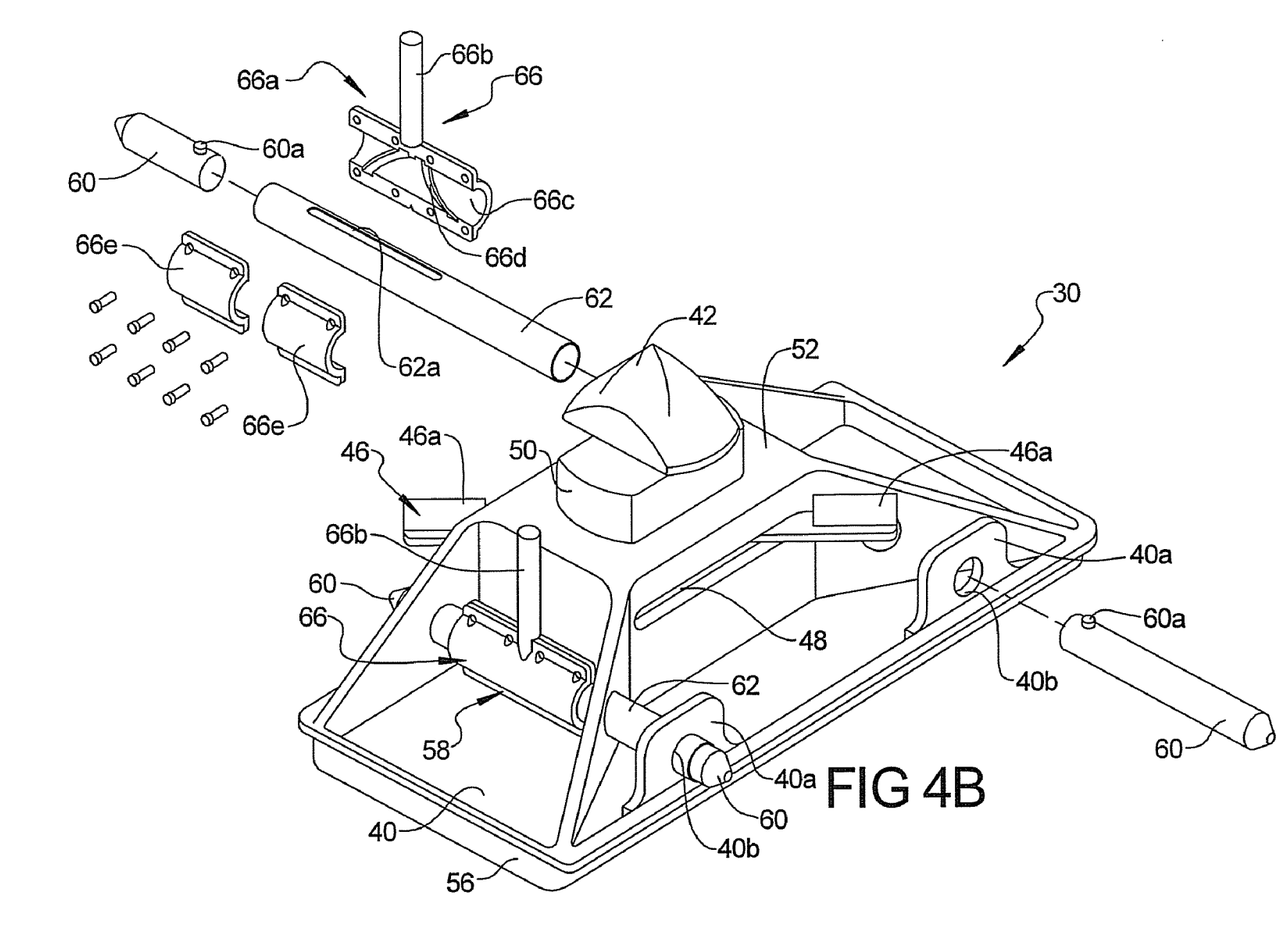
FIG. 4B is a partial, exploded perspective view of the slide unit of FIG. 4A.
Figure 4C:
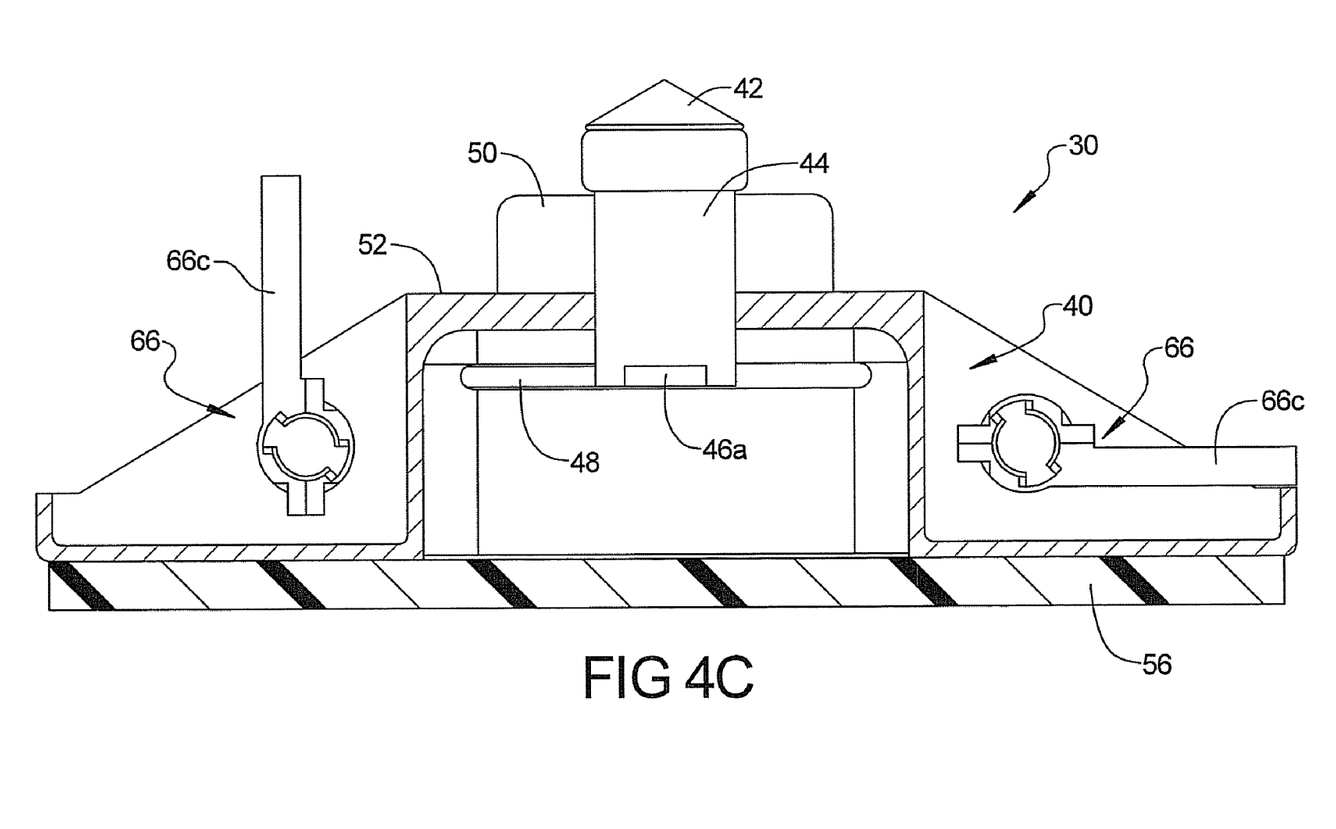
FIG. 4C is a cross sectional side view of the slide unit taken in accordance with section line 4C-4C in FIG. 4A.

Referring to FIGS. 4A and 4C, the slide unit 30 is shown in greater detail. The slide unit 30 includes a housing 40 that may be made of aluminum, steel or any other suitably strong material. The housing 40 includes a standard ISO twist lock locking element 42 that is coupled via a shaft 44 to a manually rotatable locking lever 46. Slots 48 enable outer end portions 46a of the locking lever 46 to project from the housing 40 and to be manually grasped by a user and rotated. When the locking element 42 is rotated 90° from the position shown in FIG. 4A such that it is parallel with a neck portion 50 of the housing 40, then the locking element 42 can be inserted through the opening of a standard ISO fitting at one corner of the CROP 14, upon which the neck portion 50 will extend through the opening and the corner of the crop 14 will be supported on a planar support surface 52 of the housing 40. The locking element 42 can then be moved into the position shown in FIG. 4A by the user rotating the locking lever 46 into the position shown in FIG. 4A. This captures the ISO fitting at the corner of the CROP 14 between the locking element 42 and the planar support surface 52.

With further reference to FIGS. 4A and 4B, the housing 40 includes a plate 56 mounted on a lower surface thereof. The plate 56 enables low-friction sliding movement on the side unit 30 along the tracks 24 and 26. The plate 56 may be made from any suitably durable, low-friction material. However, one specific material that is particularly well suited for use is polyethylene and, more particularly, ultra-high molecular weight (UHMW) polyethylene. The plate 56 may be secured by adhesives or conventional fastening elements to the lower surface 40. If conventional fastening elements are used, then it will be understood that such elements should be recessed into the plate 56 so that only the plate 56 itself contacts the bottom wall of its associated track 24 or 26 when the slide unit 30 is in use. The plate 56 may vary in thickness but preferably has a thickness with a range of about 0.25-0.5 inch (6.35-12.7 mm).

Each slide unit 30 is able to spread the load of a fully loaded CROP or a fully loaded 1077 flatrack over an area sufficiently large so that it reduces the pressure on the floor 22 to preferably less than about 100 psi. A pressure of 100 psi is presently the allowable weight capacity on a cargo area floor of current U.S. military cargo transport aircraft. The plate 56 of each slide unit 30 operates as a low friction surface that allows fully loaded CROPs and 1077 flatracks to be pulled or pushed along the tracks 24 and 26 with a minimal degree of force.

With further reference to FIGS. 4A and 4B, optionally each slide unit 30 may also include one or more locking pin assemblies 58, provided the tracks 24 are provided with a corresponding plurality of holes with which the locking pin assemblies 58 can engage. In the exemplary embodiment of the slide unit 30 shown in FIG. 4A, a pair of the locking pin assemblies 58 are illustrated, but it will be appreciated that a single locking pin assembly could be employed, or alternatively more than two locking pin assemblies could be employed provided the dimensions of the housing 40 are sufficient to accommodate the desired number of locking pin assemblies.

Referring specifically to FIG. 4B, each locking pin assembly 58 may include a pair of locking pins 60 positioned within a sleeve 62. The sleeve 62 is supported within openings 40b in upstanding flanges 40a of the housing 40. The sleeve 62 may include an elongated slot 62a having a predetermined length. Each locking pin 60 may be provided with a retaining pin 60a that projects outwardly perpendicularly therefrom. The retaining pins 60a are inserted through suitably sized bores in the locking pins 60 only after the locking pins 60 have been inserted into their associated sleeve 62, and the sleeve 62 inserted through its associated flanges 40a. In this manner the retaining pins 60a capture the locking pins 60 within the sleeve 62, while the sleeve is retained on the housing 40.

Referring further to FIG. 4B, a manually graspable latching assembly 66 is employed to enable a user to manually move the locking pins 60 between retracted (unlocked) and extended positions without the need for any external tools. The latching assembly 66 includes a first component 66a having a graspable member 66b projecting therefrom, and a circumferential sleeve portion 66c. The sleeve portion 66c includes a helical slot 66d formed therein that has a width sufficient to receive the retaining pin 60a of its associated locking pin 60. A pair of circumferential clamping members 66e may be secured to the first component 66a via suitable threaded fasteners or by press fit fasteners to clamp the components 66a and 66e around the sleeve 62. Components 66a and 66e also maintain the sleeve 62 laterally fixed between its corresponding pair of flanges 40a. By manually rotating the latching assembly 66 via the graspable member 66b, the pair of locking pins 60 held within the sleeve 62 can be moved slidably laterally between extended and retracted positions. While the foregoing describes one suitable latching assembly for controlling movement of the locking pins 60, it will be appreciated that various other types of manually operable control systems could be employed to extend and retract the locking pins 60. For example, a coil spring could be placed between facing end portions of the two locking pins 60 to bias the locking pins outwardly into a normally extended position. Manually graspable elements could be formed on each locking pin 60 that enable the locking pins to be retracted by squeezing together the graspable elements with the fingers of one hand. Pushbutton release arrangements could also be easily incorporated.

Figure 6:
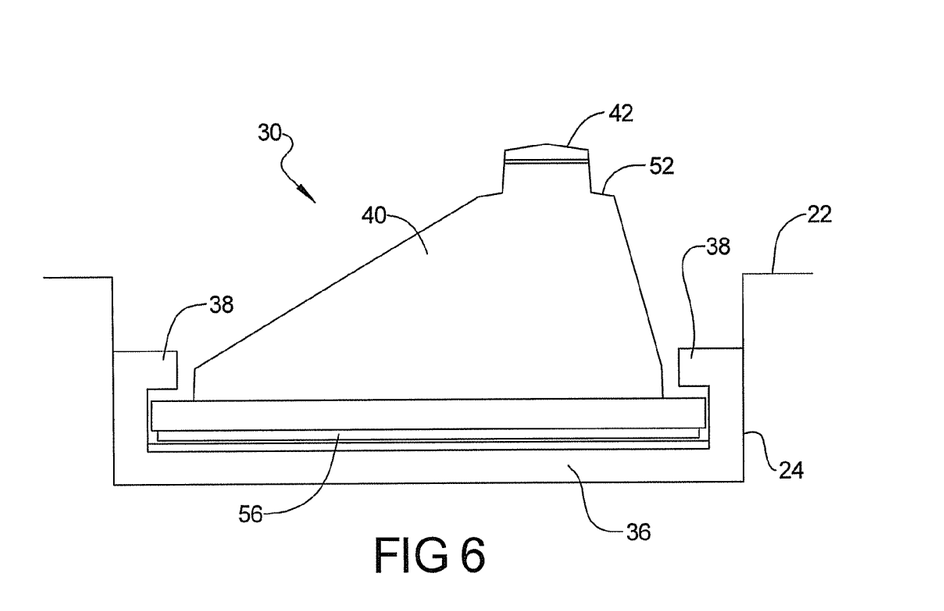
FIG. 6 is an end view of the slide unit and track of FIG. 5, but with the slide unit having been rotated 180 degrees before entering the track.

With brief reference to FIGS. 5 and 6, the slide unit 30 is illustrated installed in two different orientations within the support track 24. In FIG. 6, the slide unit has been rotated 180° before sliding it into the track 24. The housing 40 is formed so that the ISO twist locking element 42 and is associated planar support surface 52 are offset from a longitudinal centerline of the housing 40. The amount of offset is such that with the tracks 42 installed at a spacing of 42.5 inches (107.95 cm), the spacing between the locking elements 42 of a pair of the slide units 30 disposed in the tracks 24 can be varied between approximately 40.0 inches (101.6 cm) and 44.5 inches (113.03 cm) to align with the ISO fittings of either the CROP 14 or of a 1077 flatrack.

Referring now to FIGS. 1, 7, 8 and 9, the loading of the CROP 14 into the cargo area 18 of the aircraft 12 will be described. With reference to FIG. 1, the vehicle 16 is positioned such that a loader arm 16a is able to lift the aft corners 14b of the CROP via an upstanding arm 14c of the CROP. The loader arm 16a slides the forward corners 14a of the CROP 14 up the ramp 20 towards a first end 70 of the ramp while the ramp is in a lowered position. In this regard, the extension toe 34 may or may not be used depending upon whether there is sufficient clearance for the loader arm 16a to manipulate the CROP 14 onto and up the ramp 22.

Before the forward end 14a of the CROP 14 is lowered onto the ramp 20, a pair of slide units are positioned in the flared ends 26a (FIG. 3) of the tracks 26. The CROP 14 is then lowered further so that the forward end 14a comes to rest on the pair of slide units 30 that have been positioned in the flared ends 26a of the tracks 26. At this point the CROP 14 is in the position shown in FIG. 1. It will be appreciated that at this point, the ISO locking element 42 of each slide unit 30 will be positioned parallel to the neck 50 (FIG. 4A) so that the neck portion 50 of each slide unit 30 is able to engage within the ISO receptacle at each of the two outer corners of the forward end 14a of the CROP 14. The locking pins 60 are also retracted at this point. The loader arm 16a is then raised further to push the CROP 14, which is supported by the slide units 30, along the tracks 26. The low-friction plates 56 enable the CROP 14 to be pushed along the tracks 26 with a minimal degree of resistance.

In FIG. 7, just before the aft end 14b is lowered onto the ramp 20, a second pair of the slide units 30 are placed in flared portions 26a of the tracks 26. The aft end 14b of the CROP 14 is then lowered onto the slide units 30 so that the locking element 42 of each is received within the opening at each of the two corners of the aft end 14b of the CROP 14. The CROP 14 is then pushed further up the ramp 20 a short distance, for example another 6-12 inches (15.24 cm-30.48 cm) until the second pair of slide units 30 are positioned within the tracks 26.

Figure 8:
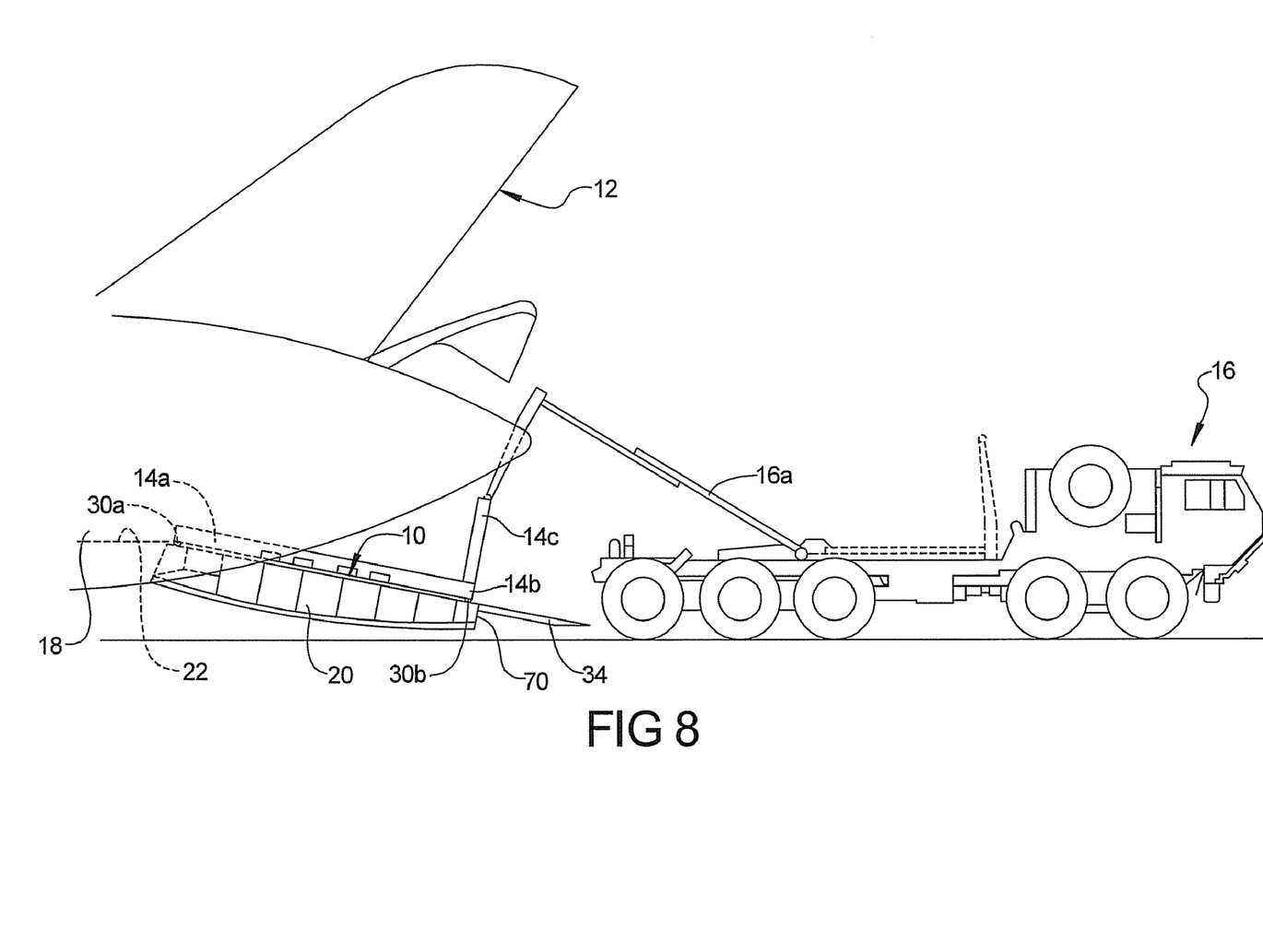
FIG. 8 illustrates the CROP being supported by four of the slide units and having been moved slidably fully on to the ramp.

In FIG. 8, the ramp 20 is raised to a position generally co-planar with the floor 22 in side the cargo area 18 of the aircraft 12.

Figure 9:
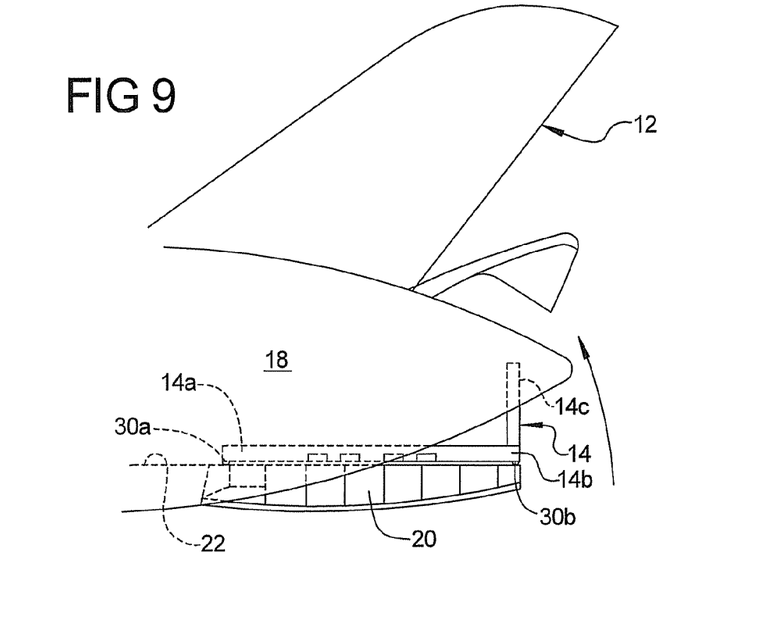
FIG. 9 illustrates the ramp having been lifted to a position generally co-planar with a floor of the interior cargo area of the aircraft.

In FIG. 9, a cable, chain or other like component 72 may be coupled to the forward 14a of the CROP 14 to pull the CROP end onto the tracks 24. Unloading of a CROP or 1077 flatrack is performed in a manner essentially opposite to that described above for FIGS. 1, 7, 8 and 9.

Figure 10:
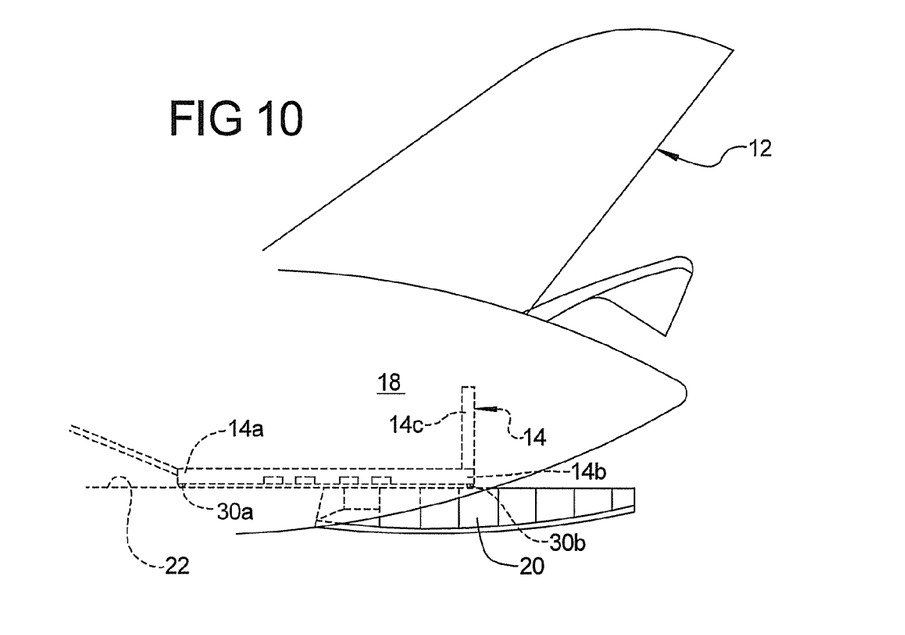
FIG. 10 illustrates the CROP in the process of being moved slidably into the interior cargo area of the aircraft.
Figure 11:
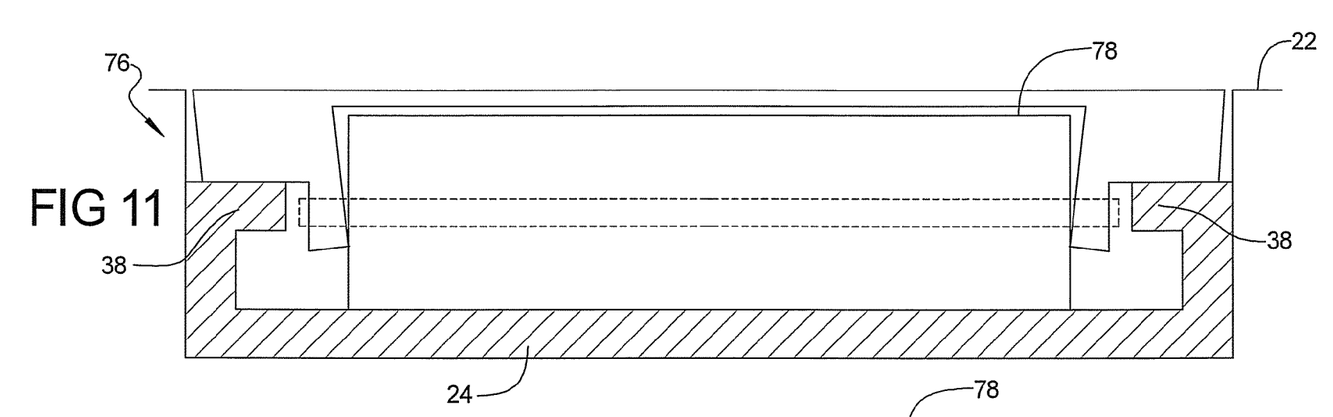
FIG. 11 illustrates how a roller conveyor component can be placed on one of the tracks to allow the roller conveyor component to be used to move cargo on the rollers of the component.
Figure 12:
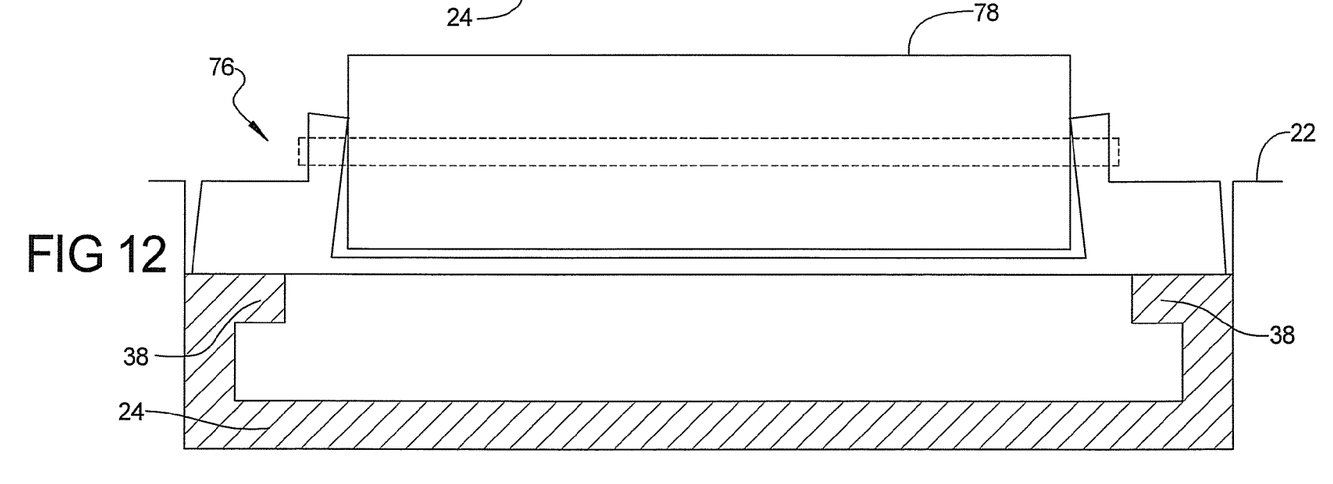
FIG. 12 illustrates how the roller conveyor component can be placed in an upside down orientation on the track to form a substantially smooth, flat floor of the cargo area of the aircraft.

Referring briefly to FIGS. 10 and 11, the tracks 24 also enable a roller conveyor apparatus 76 to be used in both operable and inoperable configurations. In the inoperable configuration shown in FIG. 10, the roller conveyor apparatus 76 is placed with its rollers 78 facing downwardly and is supported on the ledges 38 of the track 24. In this configuration, a relatively smooth, uninterrupted floor 22 is formed within the cargo area 18. In FIG. 11, the roller conveyor apparatus 76 in placed in its operable orientation with the rollers 78 facing upwardly. The roller conveyor components 76 may be used to assist in rolling palletized cargo thereon.

Figure 13:
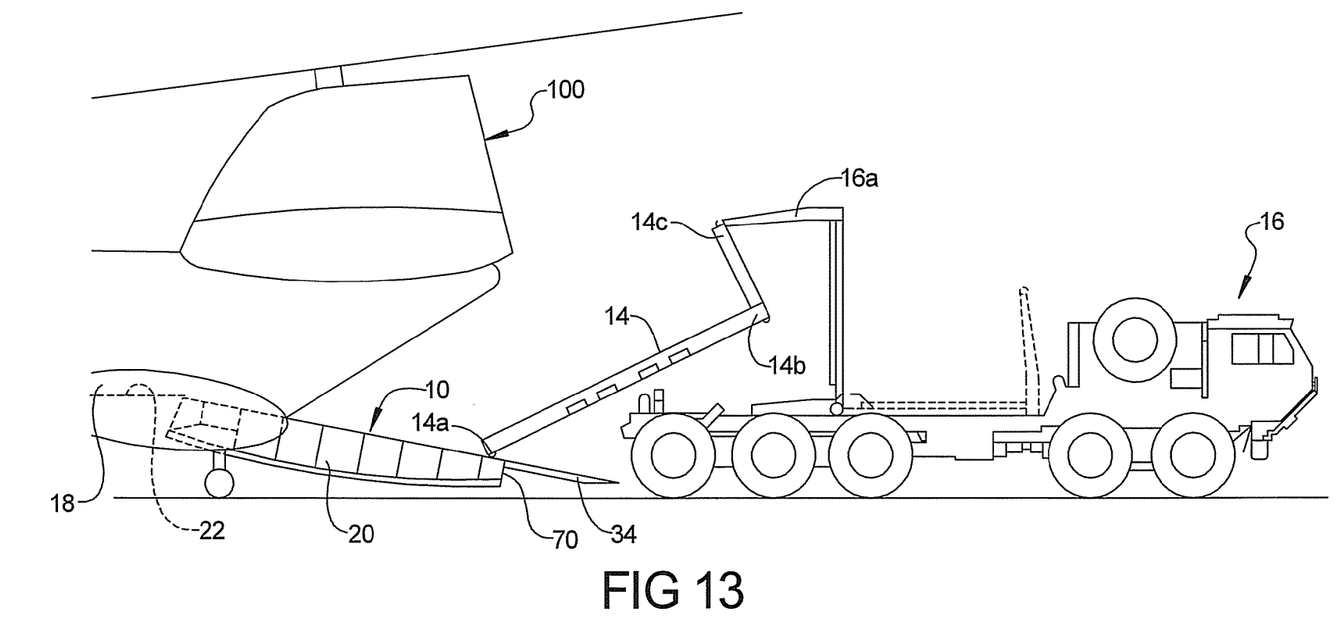
FIG. 13 illustrates a crop being loaded onto a loading ramp of a cargo rotorcraft.

FIG. 13 illustrates the system 10 being used with a cargo rotorcraft 100.

The system 10 and its method of use enables CROPs, 1077 flatracks or other load supporting structures to be moved slidably along a pair of tracks during loading and off-loading procedures. This eliminates the need for large, heavy equipment, such as a K-loader and a crane that would otherwise be required to load a CROP or flatrack into a cargo area of a cargo transport aircraft or rotorcraft, or to remove the CROP or flatrack from a cargo area off such a mobile platform. This feature enables CROPs and 1077 flatracks to be loaded and/or unloaded from airborne mobile platforms at remote sites where a K-loader and a crane are not available, or where it would be difficult or impossible to transport such components to a remote site. Each slide unit 30 forms an essentially zero maintenance component that can easily be removed from its associated track when not in use, and is sufficiently small and lightweight so that it can be easily handled by an individual.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of moving cargo along a cargo area of a mobile vehicle, comprising:

positioning a plurality of four independent load supporting slide units within a plurality of tracks supported in a support surface associated with said mobile vehicle, the four independent load supporting slide units being spaced apart to form first and second pairs for supporting four corners of a load supporting structure thereon;

lowering a leading edge pair of corners of the load supporting structure upon which said cargo is positioned on to said first pair of slide units;

after the leading edge pair of corners is resting on said first pair of slide units, then moving said load supporting structure at least partially into said cargo area until a trailing edge pair of corners of the load supporting structure is positioned over said plurality of tracks;

aligning the second pair of slide units under the trailing edge pair of corners;

lowering the trailing edge pair of corners onto said second pair of slide units;

using said first and second pairs of slide units to slidably move said load supporting structure along and above said tracks so that said cargo is positioned entirely within said cargo area of said mobile vehicle; and locking the first pair of slide units to said leading edge pair of corners and locking said second pair of slide units to said trailing edge pair of corners, through the use of manually engageable locking structure associated with each one of said first pair of slide units and each one of said second pair of slide units.

2. The method of claim 1, wherein said positioning a plurality of four independent load supporting slide units within said plurality of tracks comprises positioning said tracks on a loading ramp of said mobile vehicle.

3. The method of claim 2, wherein said positioning a plurality of four independent load supporting slide units within said plurality of tracks comprises positioning said tracks on a loading ramp of a cargo aircraft.

4. The method of claim 2, wherein said positioning a plurality of four independent load supporting slide units within said plurality of tracks comprises positioning said tracks on a loading ramp of a rotorcraft.

5. The method of claim 1, wherein said positioning a plurality of four independent load supporting slide units within said plurality of tracks comprises using a first pair of said load supporting slide units and positioning said first pair of slide units adjacent and within first ends of a pair of tracks supported within said support surface, prior to positioning a first end of said load supporting structure on said first pair of slide units.

6. The method of claim 5, wherein said using said plurality of slide units to slidably move said load supporting structure comprises using a second pair of said load supporting slide units positioned adjacent and within said first ends of said tracks, after said first pair of slide units has been slidably moved within said tracks to a predetermined position on said support surface, and such that said second pair of slide units is positioned to receive a second end of said load supporting structure thereon.

7. The method of claim 1, wherein said positioning a plurality of four independent load supporting slide units within said plurality of tracks comprises using a pair of tracks that are positioned in a support surface of a cargo aircraft.

8. The method of claim 1, wherein said positioning a plurality of four independent load supporting slide units within said plurality of tracks comprises using a pair of tracks that are positioned in a support surface of a cargo area of a rotorcraft.

9. A method of moving cargo along a cargo area of a mobile vehicle, comprising:
   positioning a plurality of four independent load supporting slide units within a plurality of tracks supported in a support surface associated-with said mobile vehicle, the four independent load supporting slide units being spaced apart to form first and second pairs for supporting four corners of a load supporting structure thereon;
   lowering leading edge corner portions of the load supporting structure upon which said cargo is positioned, on to said first pair of slide units, such that said first pair of slide units support the leading edge corner portions of said load supporting structure above the tracks;
   after the leading edge corner portions are resting on said first pair of slide units, using said first pair of slide units to move said leading edge corner portions of the load supporting structure into the cargo area until a pair of trailing edge corner portions of the load supporting structure is positioned over the second pair of the slide units;
   lowering the trailing edge pair of corner portions on to the second pair of slide units;
   sliding the first and second pairs of slide units further into the cargo area until the cargo supporting structure is entirely located within the cargo area;
   manually locking each of the first pair of slide units to the leading edge pair of corner portions using structure associated with each one of the first pair of slide units, and manually locking each of the second pair of slide units to the trailing edge pair of corner portions using structure associated with each one of the Second pair of slide units; and
   manually locking each said slide unit to its associated said track using structure associated with each said slide unit.

10. The method of claim 9, wherein said operation of manually locking each said slide unit to its respective said track comprises:
   providing a manually engageable locking pin assembly on each said slide unit, each said locking pin assembly including a locking pin that extends to engage said tracks when moved from a retracted to an extended position; and
   manually moving the locking pin of each said locking pin assembly into the extended position to lock each said slide unit to its respective said track.

* * * * *